March 2, 1943.　　　　T. J. LEHANE　　　　2,312,917
WATTAGE REGULATOR
Filed Aug. 4, 1939
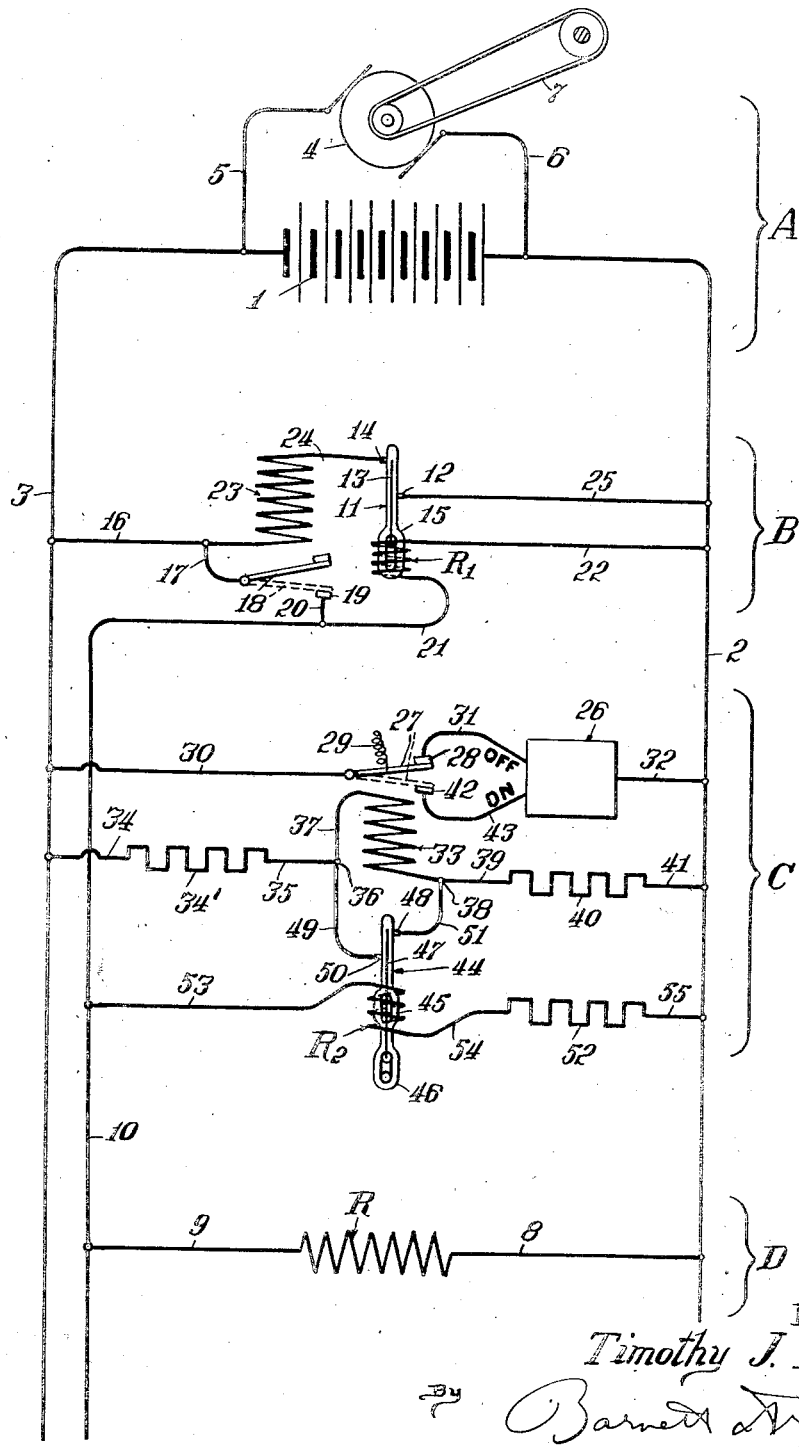
Inventor
Timothy J. Lehane
By Barnett Truman
Attorneys Patented Mar. 2, 1943

2,312,917

UNITED STATES PATENT OFFICE 2,312,917

WATTAGE REGULATOR

Timothy J. Lehane, Chicago, Ill., assignor to Vapor Car Heating Company, Inc., Chicago, Ill., a corporation of New York Application August 4, 1939, Serial No. 288,352

3 Claims. (Cl. 219—20)

This invention relates to a wattage regulator, that is a regulating device for maintaining the wattage or total electrical power applied in a circuit substantially constant over a period of time, when the current is derived from a source of power which has a varying voltage. More particularly the apparatus is intended to so regulate the wattage that the amount of electrically produced heat applied at some definite location will remain substantially constant, despite variations in the voltage of the power source. This is accomplished by interrupting the current or applying the current intermittently, the total time that the current is flowing increasing as the voltage is lowered or decreasing as the voltage rises, in such an automatically timed relation that the total amount of heat developed during a predetermined period of elapsed time will remain constant, and will be substantially uniformly applied during this period of time.

Briefly described, the wattage regulator or current interrupting mechanism comprises (in the preferred form here shown) a thermostatic tube adapted to complete a control circuit at a rather high temperature, for example 300° F. As will be hereinafter apparent, this high temperature tube is used so that changes in the atmospheric temperature prevailing at the location of the regulator will have no substantial effect on the correct operation of the regulator. The control circuit that is made and broken by the thermostatic tube energizes a relay which actuates a switch or interrupter in the main circuit or circuits in which the wattage or heat output is to be regulated. The thermostatic tube is operated by the heat from an electric resistance, and the energizing circuit for this heater is also interrupted by the relay-operated switch. All of these circuits are energized from the same source of electricity, the voltage of which may vary from time to time.

The principal object of this invention is to provide an improved wattage regulator of the type briefly described hereinabove and disclosed more in detail in the specifications which follow.

Another object is to provide an electrical apparatus, energized from a source of power of variable voltage, adapted to provide a uniform application of heat at some specified location.

Another object is to provide means for uniformly applying a substantially constant amount of electrically produced auxiliary heat to a control thermostat.

Other objects and advantages of this invention will be more apparent from the following detail description of one approved form of apparatus designed and operating according to the principles of this invention.

The drawing is a wiring diagram showing the wattage regulator as used in combination with a power source of varying voltage, and two examples of circuits in which the wattage or heat output is to be maintained substantially constant.

Referring to the drawing, the source of power is indicated at A, B is the wattage regulator, and C and D are two electrical devices requiring a constant wattage, or constant supply of electric power.

The source of power A, in the example here shown, is a storage battery 1 from which extend the two power mains 2 and 3. For example, this battery may be the source of electric power used for lighting and heat-controlling purposes on a railway car, the battery being re-charged by a dynamo 4 connected across the battery as indicated at 5 and 6, the dynamo being driven from the running gear of the car through belt-gearing indicated at 7. It may be assumed, by way of example, that this battery 1 will normally have a voltage across its terminals of 30 volts, but this voltage may vary through a range of several volts both above and below 30. However, let it be assumed in this present example that the voltage will never, under ordinary circumstances, drop below 28 volts.

At D is shown a simple circuit comprising a heating resistance R adapted to give out heat when a current is passed therethrough, and it is desired to maintain this heat output at a substantially constant rate. If the voltage $E_1$ is assumed to be the minimum (for example 28 volts) that will ever be obtained from the source A, then by Ohm's law $$E_1 = I_1 \times R$$

when $I_1$ is the corresponding current. If this current flow is continuous, the wattage or heat output will be $$E_1 \times I_1 = I_1^2 \times R$$

Now it is desirable to have this heat output $I_1^2 \times R$ remain constant but if the voltage of the power source should increase to E (for example 30 volts) then the consequent current will increase to I (since $E = I \times R$) and the heat output $I^2 \times R$ will be greater than the former heat output $I_1^2 \times R$. However, the total heat output over a given period of time can be kept at the desired smaller value of $I_1^2 \times R$, even though the current has increased to I, if the current does not flow continuously but is interrupted at regular intervals, that is a suitable time factor Y is introduced so that $$Y \times I^2 \times R = I_1^2 \times R$$

Then $$Y = I_1^2 \times R / I^2 \times R = I_1^2 / I^2 = E_1^2 / E^2$$

This value of Y will be a fraction, less than 1, for example ⅘. That is the current flowing through R will be intermittent, flowing ⅘ of the entire time, when the voltage increases to E. It will be noted that one side of resistance R is connected through wire 8 directly to main 2 leading from source A. However, the other side of the resistance R is not connected directly with the other battery main 3, but is connected through wire 9 with an auxiliary main 10 which connects with main 3 through the wattage regulator B as hereinafter described, the regulator B introducing the time factor Y, that is interrupting and re-establishing the current at proper intervals so that the total heat output of resistance R will remain substantially constant for any period of time regardless of variations in the source voltage. The wattage regulator B, in the preferred form here shown by way of example, comprises a mercury-tube thermostat 11 having a lower contact 12 that is always engaged by the mercury column 13 and an upper contact 14 that is engaged by the mercury column when the thermostat is subjected to a rather high temperature, for example 300° F. The heat is applied by a resistance coil $R_1$ enclosing the bulb 15. A high temperature tube is selected so that the effect of atmospheric temperature changes is proportionately so small as to be negligible. Preferably the regulator B will be positioned at an enclosed location so that the variations in adjacent atmospheric temperature will be small and furthermore the system controlled usually, as in the present example, functions to maintain a substantially constant temperature in the space where the wattage regulator is located.

Whenever the temperature at thermostat 11 is below 300° F. the heating resistance $R_1$ will be energized over the following circuit: from main 3 through wires 16 and 17, relay-armature 18, fixed contact 19, wires 20 and 21, resistance $R_1$, and wire 22 to the main 2. The heat thus supplied will cause mercury column 13 to rise into engagement with fixed contact 14 thus completing a relay-energizing circuit as follows: from main 3 through wire 16, relay coil 23, wire 24, thermostat 11, and wire 25 to main 2. The energized relay-coil 23 will now lift armature 18 away from fixed contact 19 and break the heater circuit previously described. At the same time all circuits extending through auxiliary main 10 will be broken, such circuits formerly leading from the battery 1 through main 3, wires 16 and 17, armature 18, fixed contact 19 and wire 20 to the auxiliary main 10. It will thus be seen that all circuits completed through auxiliary main 10 will be energized and de-energized simultaneously with the thermostat-heater $R_1$.

The thermostat 11 and heating resistance $R_1$ will be so designed that when the voltage from the source is some predetermined minimum $E_1$ (for example 28 volts as already assumed) then the wattage or heat output of heater $R_1$ will be $I_1^2 \times R_1$ and this heat when continuously applied will just keep the mercury column 13 up in engagement with the fixed contact 14. If the voltage should fall below $E_1$ the heat will never be sufficient to complete the relay-energizing circuit through thermostat 11, and the heater $R_1$ will operate continuously, but we have assumed that the voltage $E_1$ has been selected at a minimum so this will never occur. At any other voltage E above voltage $E_1$ the thermostat and relay assembly will "cycle," that is the relay and heating circuits will be successively made and broken. That is, the heater $R_1$ will remain energized until the thermostat closes the relay or control circuit when mercury-column 13 engages contact 14, whereupon the energized relay will lift the armature 18 and break the heater-energizing circuit. Since the required heat is no longer being applied to the thermostat the mercury-column 13 will immediately fall, breaking the relay circuit so that armature 18 will fall and again close the heater-energizing circuit. This cycle of events will repeat itself indefinitely. The heating circuit will flow for a decreasing portion of the time as the voltage E rises, with the result that the total heat output at $R_1$ during any period of time will remain substantially constant, that is just sufficient heat will be applied to the thermostat to perpetuate the cycling operation.

By Ohm's law $$I_1 = E_1 / R_1$$

and the wattage or heat output will be $$I_1 \times E_1 = E_1 \times E_1 / R_1$$

When the voltage rises to some higher value such as E (for example 30 volts) the wattage will be $$Y \times E \times E / R_1$$

when Y represents the time factor of the cycling operation. By assumption, the heat output during any given period of time remains constant (just enough to cause the thermostat to cycle) so that $$Y \times E^2 / R_1 = E_1^2 / R_1$$

or $$Y = E_1^2 / E^2$$

and this is the same fractional value that was previously found when considering the requirements of resistance R in circuit D.

Now if any other resistance is considered in a parallel circuit, for example the resistance $R_2$ of controlled circuit C, the wattage at minimum voltage $E_1$ will be $E_1^2 / R_2$ and at E volts the wattage will be $$Y \times E^2 / R_2$$

Since $$Y = E_1^2 / E^2$$

then the wattage at E volts will be $$Y \times E^2 / R_2 = E_1^2 / E^2 \times E^2 / R_2 = E_1^2 / R_2$$

which was also the wattage at voltage $E_1$. Therefore the wattage at heating resistance $R_2$ will remain constant at any voltage value E at or above the minimum value $E_1$. Obviously the higher current $I_2$ will not flow continuously but the total heat output at $R_2$ over a period of time will be the same as if the smaller current $I_1$ flowed continuously at the voltage $E_1$.

As one practical application of this wattage regulator the controlled apparatus combination shown at C will now be described more in detail. This assembly functions to regulate the supply of heat to an enclosure so as to maintain a substantially constant temperature therein. At 26 is indicated a valve or similar device for controlling the flow of heat or other heating medium, whereby heat is added to the enclosure to compensate for heat losses. When the relay armature 27 is held against fixed contact 28 by spring 29, a circuit moving the valve 26 to closed or "off" position will be completed as follows: from main 3 through wire 30, armature 27, fixed contact 28, wire 31, valve 26, and wire 32 to the other main 2. The relay coil 33 will normally be energized over the following circuit: from main 3 through wire 34, balancing resistance 34', wire 35, relay terminal 36, wire 37, relay coil 33, relay-terminal 39, wire 39, resistance 40, and wire 41 to the main 2. When the relay is thus energized, armature 27 will be pulled down into engagement with fixed contact 42 thus completing a circuit for moving valve 26 to the open or "on" position, this circuit being as follows: from main 3 through wire 30, armature 27, contact 42, wire 43, valve 26, and wire 32 to the main 2.

The controlling thermostat 44 is formed with two connected bulbs 45 and 46. Bulb 46 is exposed to respond to atmospheric temperature changes, while the heating coil $R_2$ is applied to the bulb 45. The thermostat 44 may be so designed that at a certain atmospheric temperature, for example 75° F., the mercury-column 47 will engage the upper fixed contact 48 (without the aid of auxiliary heat from resistance $R_2$). This will complete a circuit short-circuiting the relay coil 33, this circuit being as follows: from terminal 36 through wire 49, lower contact 50, mercury column 47, upper contact 48, and wire 51 to the other relay terminal 38. Thus, when the atmospheric temperature rises to 75° the relay will be short-circuited and de-energized and the armature 27 will be moved to the position shown in solid lines in the drawing to cause the valve to close and stop the further supply of heat to the enclosure. When the atmospheric temperature falls below 75°, the shunt circuit will be broken at the thermostat 44, the relay will again be energized, and the valve-opening circuit will again be closed.

Now the heating resistance $R_2$ is adapted to impart a predetermined amount of additional heat to the thermostat 44. For example if this additional heat amounts to 5°, the thermostat will function at an atmospheric temperature of 70°. The exact amount of heat supplied by heater $R_2$, and consequently the functioning temperature of the thermostat, may be selected by varying the balancing or adjusting resistance 52. The heating circuit is from auxiliary main 10 through wire 53, heater $R_2$, wire 54, resistance 52, and wire 55 to the main 2.

Now if the wire 53 led from main 3 instead of main 10 (that is direct from the battery), and the voltage remained constant at the minimum of $E_1$ volts, then the heat output at $R_2$ would remain constant and the heat correction at the thermostat would always be correct. However, if the voltage changes to some higher value such as E, then the heat correction will become excessive and the thermostat will function at too low a temperature, for example 68°. It is necessary that the heat output or wattage at $R_2$ be kept constant despite variations in the voltage of source A. By connecting this heater $R_2$ across the mains 2 and 10, as shown, the wattage regulator B will function in the manner already described to control the timing or cycling of the current through heater $R_2$ so that the heat output will always remain constant over a period of time and the functioning temperature of the thermostat will always be correct.

This wattage regulator B will function in like manner to maintain the wattage constant in any other type of controlled circuit, as exemplified by the circuit D already described.

The regulator B may also be varied in detail, as long as suitable means are provided for properly interrupting or cycling the controlled circuit to compensate for variations in voltage at the source of power.

I claim:

1. Means for obtaining a substantially uniform wattage in a controlled circuit energized from a source of electric power of varying voltage, said means comprising a self-closing switch in the controlled circuit, a relay-coil adapted, when energized, to open the switch, a mercury-column thermostat including a pair of spaced contacts adapted to be connected through the mercury-column at a predetermined maximum temperature to form a circuit closer, a relay-energizing circuit including the source of power, the relay-coil and the thermostatically operated circuit-closer, an auxiliary electric heater for raising the temperature at the thermostat to cause the mercury column to close the relay-energizing circuit, and an energizing circuit for the heater which includes the heater, the source of power, and the first-mentioned switch.

2. In combination means for obtaining a substantially uniform wattage in a circuit energized from a source of electric power of varying voltage, said means comprising a relay including a switch in the circuit, said switch and circuit being closed when the relay is deenergized, a thermostat, a control circuit including the source of power, the relay, and a switch controlled by the thermostat that is open at normal atmospheric temperatures in the space enclosing this thermostat, an auxiliary electric heater for raising the temperature at the thermostat to close the control circuit, and an energizing circuit for the heater including the source of power and the relay-actuated switch, a second thermostat, means controlled by said second thermostat for maintaining a predetermined atmospheric temperature in the space enclosing the two thermostats, and an electric heater in the first-mentioned circuit adapted to add a substantially constant heat-output to the second thermostat and thus select the atmospheric temperature at which this second thermostat will function, and also the normal temperature adjacent the first-mentioned thermostat.

3. Means for maintaining a substantially uniform heat output from an electric heater in circuit with a source of electric power of varying voltage, said means comprising a relay including a switch in the heater-energizing circuit, said switch and circuit being closed when the relay is deenergized, a control circuit including the source of power and the relay, a thermostat, and a switch operated by the thermostat in the control circuit that is open at normal temperatures, an auxiliary electric heater for raising the temperature at the thermostat to close the switch in the control circuit, and an energizing circuit for the heater including the source of power and the first-mentioned switch.

TIMOTHY J. LEHANE.